(12) United States Patent
Petrenko et al.

(10) Patent No.: US 8,183,741 B2
(45) Date of Patent: May 22, 2012

(54) VALVES BASED ON REVERSIBLE PIEZOELECTRIC ROTARY MOTOR

(75) Inventors: Serhiy Petrenko, Kiev (UA); Valentin Rangelov Zhelyaskov, Sarasota, FL (US)

(73) Assignee: Discovery Technology International, Inc., Sarasota, FL (US)

( * ) Notice: Subject to any disclaimer, the term of this patent is extended or adjusted under 35 U.S.C. 154(b) by 70 days.

(21) Appl. No.: 12/701,704

(22) Filed: Feb. 8, 2010

(65) Prior Publication Data

US 2010/0148102 A1 Jun. 17, 2010

Related U.S. Application Data

(63) Continuation of application No. 12/639,232, filed on Dec. 16, 2009.

(60) Provisional application No. 61/150,703, filed on Feb. 6, 2009, provisional application No. 61/138,442, filed on Dec. 17, 2008.

(51) Int. Cl.
*H01L 41/08* (2006.01)
*F16K 31/02* (2006.01)

(52) U.S. Cl. ......... 310/323.02; 251/315.01; 251/129.06; 251/129.11; 251/301; 251/304; 251/129.12; 251/129.13

(58) Field of Classification Search ............... 310/323.02–323.08; 251/129.01, 251/129.06, 129.11–129.13, 304, 315.01–315.16
See application file for complete search history.

(56) References Cited

U.S. PATENT DOCUMENTS 3,603,706 A 9/1971 Cermak et al.
(Continued)

FOREIGN PATENT DOCUMENTS

JP 63089074 A 4/1988
(Continued)

OTHER PUBLICATIONS

Leletty, R., et al., "Valves Based on Amplified Piezoelectric Acutators" [online], [retrieved on Jun. 20, 2011]. Retrieved from the Internet: http://www.cedrat.com/fileadmin/user_upload/cedrat_groupe/Publications/Publications/2002/06/Actuator2002_A4-6_VALVES-BASED-ON-AMPLIFIED-PIEZOELECTRIC-ACTUATORS.pdf (Continued)

*Primary Examiner* — Jaydi San Martin
(74) *Attorney, Agent, or Firm* — Fox Rothschild, LLP; Robert J. Sacco

(57) ABSTRACT

A piezoelectric valve is provided that includes a valve body includes a plug and a drive body coupled to the valve body and operable to cause the rotatable plug to rotate about a rotational axis. The drive body includes a shaft disposed along the axis, the shaft statically coupled to the plug and rotatably coupled to the drive body. The drive body also includes a rotor assembly disposed about the axis and rotatably coupled to the drive body. The drive body further includes a first piezoelectric actuator disposed about the axis and statically coupled to the drive body, the first piezoelectric actuator configured to frictionally engage an inner surface of the rotor assembly. The drive body additionally includes a second piezoelectric actuator disposed about the axis and statically coupled to the shaft, the second piezoelectric actuator configured to frictionally engage the inner surface of the rotor assembly.

28 Claims, 3 Drawing Sheets

U.S. PATENT DOCUMENTS

| | | | |
|---|---|---|---|
| 3,963,380 A | | 6/1976 | Thomas, Jr. et al. |
| 4,344,743 A | | 8/1982 | Bessman et al. |
| 4,352,636 A | | 10/1982 | Patterson et al. |
| 4,453,103 A | | 6/1984 | Vishnevsky et al. |
| 4,478,217 A | | 10/1984 | Shimada et al. |
| 4,648,807 A | | 3/1987 | Tippetts et al. |
| 4,909,212 A | * | 3/1990 | Minowa et al. ............ 123/337 |
| 4,959,580 A | * | 9/1990 | Vishnevsky et al. ..... 310/323.02 |
| 5,036,944 A | | 8/1991 | Danley et al. |
| 5,172,023 A | * | 12/1992 | Kawai et al. ............ 310/323.04 |
| 5,258,239 A | | 11/1993 | Kobayashi |
| 5,362,213 A | | 11/1994 | Komatsu et al. |
| 5,604,392 A | | 2/1997 | Vig |
| 5,726,518 A | * | 3/1998 | Takagi ................. 310/323.05 |
| 5,839,467 A | | 11/1998 | Saaski et al. |
| 5,877,579 A | | 3/1999 | Zumeris |
| 6,116,257 A | | 9/2000 | Yokota et al. |
| 6,230,738 B1 | * | 5/2001 | Watanabe et al. ............ 137/486 |
| 6,260,579 B1 | | 7/2001 | Yokota et al. |
| 6,467,350 B1 | | 10/2002 | Kaduchak et al. |
| 6,469,420 B2 | * | 10/2002 | Iarochenko et al. ..... 310/323.02 |
| 6,575,669 B2 | | 6/2003 | Takasan |
| 6,715,731 B1 | * | 4/2004 | Post et al. ................ 251/129.06 |
| 6,964,327 B2 | | 11/2005 | Chang et al. |
| 7,095,160 B2 | * | 8/2006 | Uchino et al. ................ 310/333 |
| 7,219,848 B2 | | 5/2007 | Sweeton |
| 7,395,607 B1 | | 7/2008 | Broderick et al. |
| 7,876,022 B2 | * | 1/2011 | Petrenko et al. .......... 310/323.03 |
| 2001/0013740 A1 | | 8/2001 | Fukui et al. |
| 2001/0022485 A1 | | 9/2001 | Oda et al. |
| 2002/0017831 A1 | | 2/2002 | Iarochenko et al. |
| 2002/0033651 A1 | | 3/2002 | Iarochenko et al. |
| 2004/0013740 A1 | | 1/2004 | Weickmann |
| 2004/0027032 A1 | | 2/2004 | Moteki et al. |
| 2004/0189150 A1 | | 9/2004 | Yamamoto et al. |
| 2004/0256956 A1 | | 12/2004 | Miyazawa |
| 2005/0012433 A1 | | 1/2005 | Brady et al. |
| 2005/0151107 A1 | * | 7/2005 | Shu ................................. 251/214 |
| 2005/0268921 A1 | | 12/2005 | Zumeris et al. |
| 2006/0006764 A1 | | 1/2006 | Ganor et al. |
| 2006/0244341 A1 | | 11/2006 | Uchino et al. |
| 2007/0119505 A1 | * | 5/2007 | Petrenko ....................... 137/554 |
| 2009/0121586 A1 | * | 5/2009 | Kesil ........................ 310/323.02 |
| 2010/0148102 A1 | | 6/2010 | Petrenko et al. |
| 2010/0148630 A1 | | 6/2010 | Petrenko et al. |
| 2010/0150754 A1 | | 6/2010 | Petrenko et al. |
| 2010/0156240 A1 | | 6/2010 | Petrenko et al. |
| 2010/0289362 A1 | | 11/2010 | Petrenko et al. |
| 2011/0050038 A1 | | 3/2011 | Zhelyaskov et al. |

FOREIGN PATENT DOCUMENTS

| | | | |
|---|---|---|---|
| JP | 63089074 A | * | 4/1988 |
| JP | 06-205590 A | | 7/1994 |
| JP | 10-117486 A | | 5/1998 |
| JP | 10-271854 A | | 10/1998 |
| JP | 11-252955 | | 9/1999 |
| JP | 2000-323763 A | | 11/2000 |
| JP | 2004-312810 A | | 11/2004 |
| JP | 2006-299889 A | | 11/2006 |
| KP | 10-2006-0097831 | | 9/2006 |
| KP | 10-2009-0054728 | | 6/2009 |
| KR | 2005-0007944 A | | 1/2005 |
| KR | 2006-0097831 A | | 9/2006 |
| KR | 10-0728510 B1 | | 6/2007 |
| KR | 2009-0054728 A | | 6/2009 |
| SU | 1782316 A3 | | 12/1992 |
| SU | 1825435 A3 | | 6/1993 |
| UA | 4169 | | 2/1993 |
| WO | WO-2007-064310 A1 | | 6/2007 |
| WO | WO 2008057061 A2 | * | 5/2008 |
| WO | WO-2008057061 A2 | | 5/2008 |

OTHER PUBLICATIONS

International Search Report mailed Feb. 24, 2010; Application Serial No. PCT/US2009/068217 in the name of Discovery Technology International, LLP.

Discovery Technology International, LLLP, et al., International Search Report mailed May 18, 2011; Application No. PCT/US2010/047494.

P. I. Maleev. New types of gyroscopes, Leningrad, Sudostroenie,1971, p. 9 and p. 31.

A.S. Kasatkin. Fundamentals of electronics. Moskva. Energiya,1966, Ch. 8. p. 540.

Lindler, J.E., et al. "Piezoelectric Direct Drive Servovalve" CSA Engineering, Mountain View, CA., "Industrial and Commercial Applications of Smart Structures Technologies", San Diego, CA Mar. 2000.

International Search Report mailed Aug. 13, 2010; Application Serial No. PCT/US2009/068294 in the name of Discovery Technology International, LLPP et al.

International Search Report mailed Sep. 28, 2010; Application Serial No. PCT/US2010/023470 in the name of Discovery Technology International, LLPP et al.

Lindler, Jason E. et al. "Piezoelectric Direct Drive Servovalve", "Industrial and Commercial Applications of Smart Structures Technologies", San Diego, CA Mar. 2000, CSA Engineering, Mountain View, CA.

Kasatkin, A. S. "Asynchronous Brushless Machines", Fundamentals of Electronics. Moscow Energy. 1966. Ch. 17, pp. 484-487.

Kasatkin, A.S. "Commutator Machines", Fundamentals of Electronics. Moscow Energy. 1966, Ch. 18, pp. 540-543.

Maleev, P. I. "Gyroscopes with Electrical Suspension of Rotor", New Types of Gyroscopes, Leningrad, Sudostroenie, 1971, p. 9 and p. 31.

International Search Report mailed May 18, 2011 in International Application Serial No. PCT/US2010/047494 in the name of Discovery Technology International, LLLP, et al.

International Search Report Mailed Dec. 27, 2010 in International Application No. PCT/US2010/35156 in the name of Discovery Technology International, LLLC.

Ermakov, V.S., et al., "Problems and ways of Improvements of Modulation Gyro with Spherical Gas-Lubricated Spin-Axis Bearing System," proceedings of teh VII St. Petersburg International Conference on Integrated Navigation Systems, St. Petersburg, Russia, May 29-31, 2000, pp. 196-199.

* cited by examiner

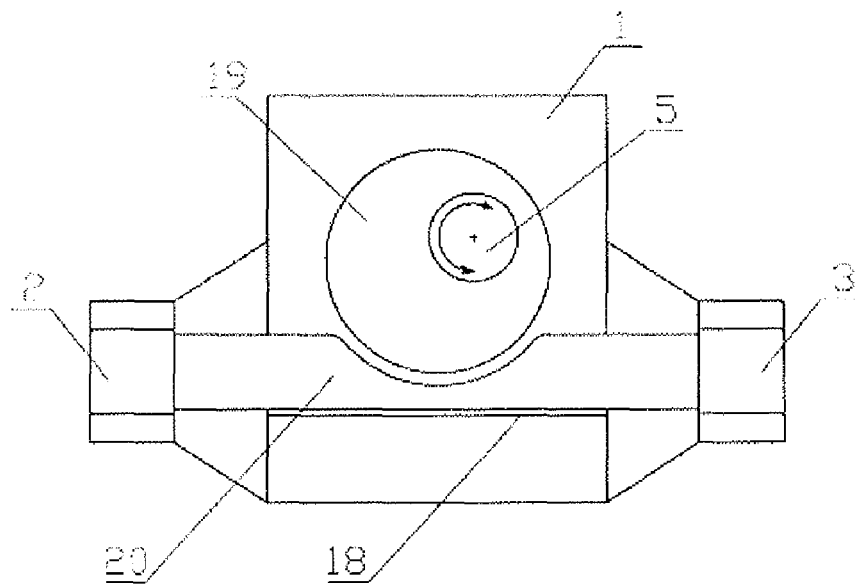
FIG. 2    200
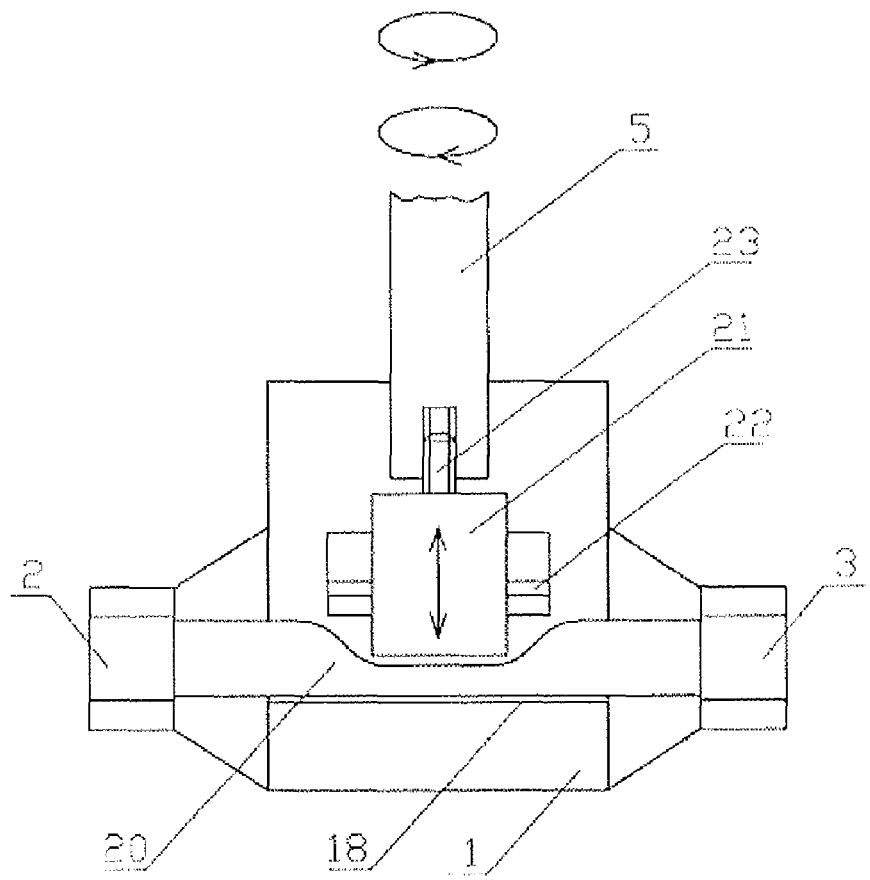
FIG. 3    300

VALVES BASED ON REVERSIBLE PIEZOELECTRIC ROTARY MOTOR

CROSS REFERENCE TO RELATED APPLICATIONS

This application claims the benefit of U.S. patent application Ser. No. 12/639,232, entitled "PIEZOELECTRIC MOTOR WITH HIGH TORQUE", filed Dec. 16, 2009, and U.S. Provisional Application Ser. No. 61/150,703 entitled "VALVES BASED ON REVERSIBLE PIEZOELECTRIC ROTARY MOTOR", filed Feb. 6, 2009, which are herein incorporated by reference in their entirety.

FIELD OF THE INVENTION

The invention relates to motorized valves, and more particularly to motorized valves based on a reversible piezoelectric rotary motors.

BACKGROUND

Valves with piezoelectric actuators have been proposed. For example, some designs include an amplified piezoelectric actuator (APA). In APA-based valves, an elastic amplifier element is coupled to the piezoelectric element to mechanically amplify the motion of the piezoelement. A disadvantage of these types of valves is that they are generally limited to a motion range on the order of a few hundred microns, even with the amplifier. Accordingly, adjustment of the amount of flow is limited and therefore the valve is not truly adjustable. As a result, conventional APA valves typically provide only two positions, an open position and a closed position. Other conventional designs include a piezoelectric element for directing flow of a fluid. In such designs, a piezoelectric element is used directly or indirectly to select between two orifices for directing flow of a liquid through a valve body. In operation, when a voltage is applied, the motion provided by piezoelement blocks one port and unblocks another. Although such a valve is controllable, the small range of movement available for piezoelectric elements cannot be used to directly control the amount of fluid flowing through a port. Rather, such a piezoelement controlled valve is generally used in conjunction with a pneumatic actuator to control the amount of fluid flowing through the selected port.

Other conventional piezoelectric valve designs include a valve stem controlled by a unidirectional piezoelectric motor. Such valve designs can regulate directly the flow of various fluids or isolate an evacuated area. Additionally, such valve designs provide a wide range of flow control, high accuracy and resolution, and linear control characteristics. However, the unidirectional nature of the valve limits the functional control characteristics of the valve.

SUMMARY

Embodiments of the invention describe reversible piezoelectric valves. In a first embodiment of the invention, a reversible piezoelectric valve is provided. The valve includes a valve body including a rotatable plug and a drive body coupled to the valve body that is operable to cause the rotatable plug to rotate about a rotational axis. The drive body includes a shaft disposed along the rotational axis, the shaft statically coupled to the plug and rotatably coupled to the drive body. The drive body also includes a rotor assembly disposed about the rotational axis and rotatably coupled to the drive body. The drive body further includes a first annular piezoelectric actuator disposed about the rotational axis and statically coupled to the drive body, the first annular piezoelectric actuator configured to frictionally engage an inner surface of the rotor assembly. The drive body additionally includes a second annular piezoelectric actuator disposed about the rotational axis and statically coupled to the shaft, the second annular piezoelectric actuator configured to frictionally engage the inner surface of the rotor assembly.

In a second embodiment of the invention, a reversible piezoelectric valve is provided. The valve includes a valve body with at least one inlet, at least one outlet, and a turning plug. The valve also includes a rotation drive kinematically connected to the turning plug through a shaft, where the rotation drive includes a reversible piezoelectric motor. The reversible piezoelectric motor includes a first annular piezoelectric resonator fixed with respect to the body, a first complementary generator acoustically coupled to the first piezoelectric resonator and having one or more first flexible pushers, and a first rotor mounted coaxially with respect to the first piezoelectric resonator and in frictional contact with the first flexible pushers. The drive body also includes a second annular piezoelectric resonator statically coupled to the turning plug through the shaft, a second complementary generator acoustically coupled to the second piezoelectric resonator and having one or more second flexible pushers, and a second rotor mounted coaxially with respect to the second piezoelectric resonator and in frictional contact with the second flexible pushers, the second rotor being statically coupled to the first rotor through a sound-proof gasket.

BRIEF DESCRIPTION OF THE DRAWINGS

FIG. 2 shows a first exemplary pinch-type piezoelectric valve, including a reversible piezoelectric motor in accordance with an embodiment of the invention.

FIG. 3 shows a second exemplary pinch-type piezoelectric valve, including a reversible piezoelectric motor in accordance with an embodiment of the invention.

DETAILED DESCRIPTION

Figure 1:
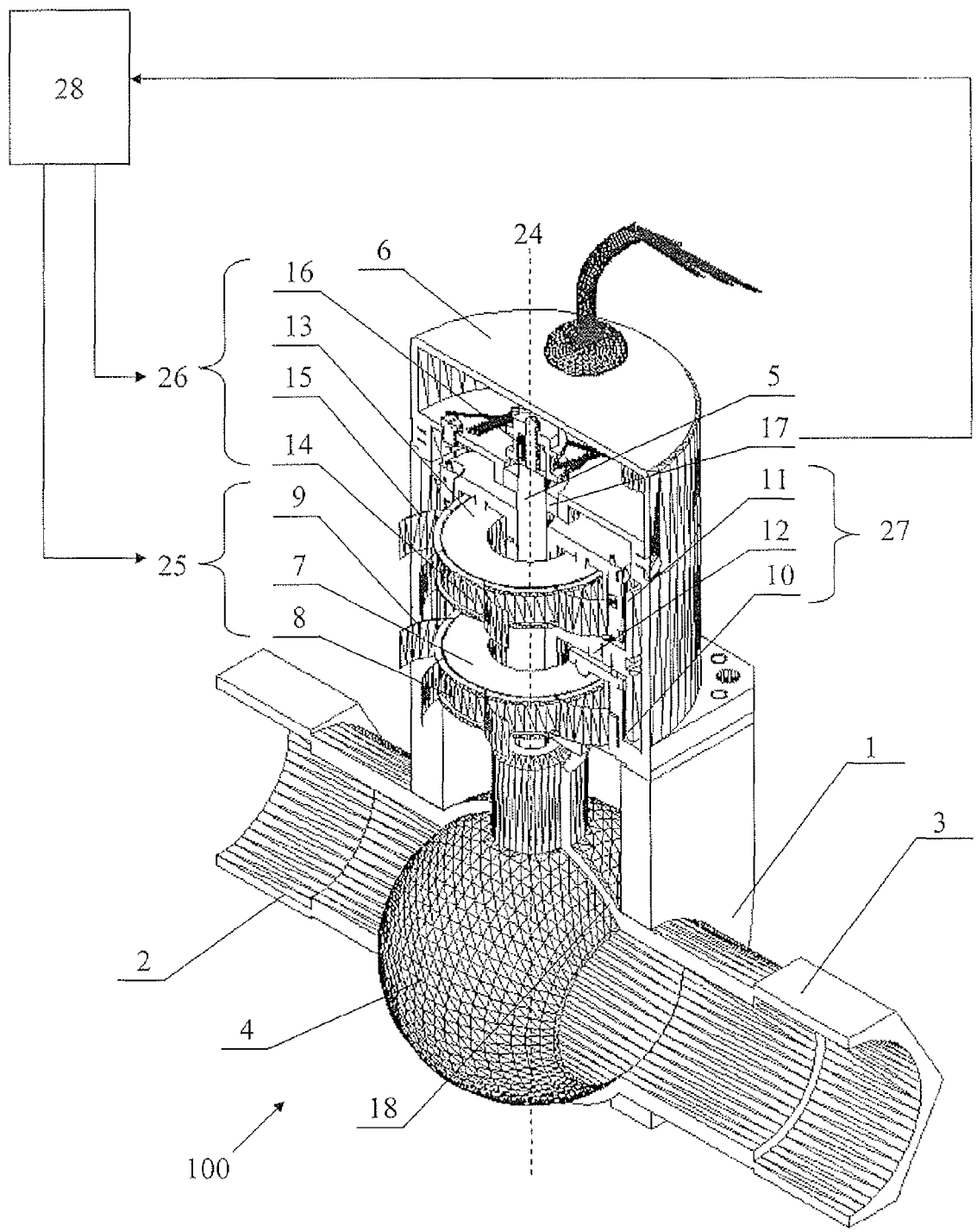
FIG. 1 shows an exemplary ball-type piezoelectric valve, including a reversible piezoelectric motor for turning a valve plug in accordance with an embodiment of the invention.

The invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

The various embodiments of the invention provide piezoelectric motorized valves. In particular, valves in accordance with the various embodiments of the invention are configured to provide a reversible rotation of the valve stem. This new valve design will be described below with respect to FIGS. 1-4.

FIG. 1 shows an exemplary piezoelectric valve 100, including a reversible piezoelectric motor, in accordance with an embodiment of the invention. The piezoelectric valve 100 in FIG. 1, has a body 1 with at least one inlet 2 and at least one outlet 3 to connect to valve 100 a pipeline system (not shown) and a rotatable turning plug 4 for adjusting a flow of fluid. Valve 1 also includes a rotation drive body 6, including a shaft 5 for kinematically connecting turning plug 4 to rotation drive body 6 and defining a rotational axis 24.

In the various embodiments of the invention, the rotation drive body 6 is a reversible piezoelectric motor. The rotation drive body 6 includes a first annular piezoelectric resonator 7, configured for excitation of radial acoustic standing waves therein. The first resonator 7 is fixed with respect to the body 1 of the valve 100 and disposed about rotational axis 24. Further, first resonator 7 can have one or more electrodes and wires (not shown) for connecting first resonator 7 to an external controller/electrical excitation source 28. The rotation drive body 6 also includes a first complementary generator of mechanical vibrations 8 acoustically coupled to first resonator 7. For example, as shown in FIG. 1, first complementary generator 8 can be in the form of an elastic wave shell or ring around an outer rim of first resonator 7. In other embodiments, first complementary generator 8 can be in the form of a disc (not shown in FIG. 1), which is acoustically coupled to a flat surface of first piezoelectric resonator 7. The first complementary generator 8 can be fitted with one or more flexible pushers 9 extending at least radially and outward with respect to rotational axis 24, as shown in FIG. 1. As a result, components 7, 8, and 9 provide a first radial piezoelectric actuator 25. The rotation drive body 6 can further include a first rotor 10, which is mounted coaxially with respect to the first piezoelectric resonator 7 (i.e., about rotational axis 24 and surrounding an outer rim of first resonator 7) and which is in frictional contact with the flexible pushers 9.

The rotation drive body 6 can also include a second annular piezoelectric resonator 13, also configured for excitation of radial acoustic standing waves therein. The second resonator 13 can be statically linked to the turning plug 4 through the shaft 5. Further, second resonator 13 can have one or more electrodes and wires (not shown) for connecting second resonator 13 to controller/external electrical excitation source 28. Similar to the first resonator 7, the second resonator 13 can have coupled thereto a second complementary generator of mechanical vibrations 14, also in the form of an elastic ring or disc. The second complementary generator 14 can also be acoustically coupled to the second piezoelectric resonator 13 and can be fitted with one or more pushers 15. As a result, components 13, 14, and 15 provide a second radial piezoelectric actuator 26. Rotation drive body 6 can further include a second rotor 11, mounted coaxially with respect to the second piezoelectric resonator 13 and which is in a frictional contact with the flexible pushers 15. The rotors 10 and 11 are statically connected through a sound-proof gasket 12 to provide a rotatable rotor assembly 27.

In FIG. 1, resonators 7 and 13 are illustrated as being excited by a single controller 28. However, the various embodiments of the invention are not limited in this regard. Rather, any system comprising one or more components capable of singly exciting resonators 7 and 13 can be used in the various embodiments of the invention.

In some embodiments of the invention, the resonators 7 and 13 can be constructed from piezoceramics selected from the group of piezo lead-zirconate-titanate-strontium ceramics (PZT) materials. However, the invention is not limited to the use of PZT materials. In other embodiments of the invention, other types of piezoelectric materials can be used.

In the exemplary embodiment shown in FIG. 1, the complementary generators 8 and 14 are configured such that elastic pushers 9 and 15, respectively, are disposed along the circumference of resonators 7 and 13, respectively, at nominally equal angular distances from one another. In some embodiments, the complementary generators 8 and 14 can be in the form of ring shells, which are tightly fitted over the piezoelectric resonators 7 and 13, respectively, around their circumferences. The elastic pushers 9 and 15 are then are attached to the external surface of their respective ring shells. In embodiments where the complementary generators comprise flexible discs, such discs can be in the shape of flat circular discs that are acoustically coupled to the piezoelectric resonators 7 and 13 across their plane surfaces. The elastic pushers 9, 15 can then be attached to the external cylindrical surface of the discs.

In some embodiments of the invention, the second piezoelectric resonator 13 or the shaft 5 can be equipped with at least one marker of angular position 16. In such embodiments, the position of the valve can then be detected using at least one sensor 17 mounted on the body of the valve. Sensor 17 can also be coupled to controller 28 or another control element to control the position of shaft 5 or otherwise control valve 100. Each specified marker in the valve of FIG. 1 can be in the form of an optical grating made of optical disc raster and each specified sensor is fabricated as an opto-electrical pair. However, the various embodiments of the invention are not limited in this regard and other methods of marking and detecting position of the valve can be used.

In the valve 100, the turning plug 4 can be shaped as a sphere, as shown in FIG. 1. However, the various embodiments of the invention are not limited in this regard and a cone or cylinder-shaped plug, with a through-hole, can be configured for sitting in the corresponding saddle 18 in the valve body 1 between the inlet 2 and outlet 3.

The piezoelectric actuators 25 and 26 work on the principal of excitation of ultrasonic radial standing waves within an annular or ring-type piezoelectric resonator. As described above, pushers 9 and 15 are attached to the piezoelectric resonators 7 and 13, respectively, through a vibrational shell or other complementary generator (8, 14). The pushers 9 and 15 are arranged to primarily extend in a generally radial direction from rotational axis 24 and physically contact a portion of rotor assembly 27. Further, pushers 9 and 15 are also arranged to extend at least partially in a direction of rotation about rotation axis 27. For example, as shown in FIG. 1, the pushers 9 comprise cantilever-type springs extending in a radial direction towards rotor 10 and in a direction of rotation about rotational axis 24. Similarly, the pushers 15 comprise cantilever-type springs extending in a radial direction towards rotor 11 and in a direction of rotation about rotational axis 24.

Therefore, to operate valve 100 in a counterclockwise direction about axis 24, controller 28 is configured to excite the first piezoelectric resonator 7 singly. As a result of not exciting the second resonator 13, the pushers 15 will apply a constant frictional force against rotor assembly 27, holding second resonator 13 fixed with respect to rotor assembly 27. Accordingly, rotor assembly 27, second resonator 13, and shaft 5 will rotate as a single unit. The excitation of first resonator 7 will however result in pushers 9 moving radially toward rotor 10 of rotor assembly 27. As a result, pushers 9 deform and begin to apply a restorative force against rotor 10 via a friction contact. Since a portion of the pushers 9 also extends along a direction of rotation, the restorative force of the pushers 9 is preferentially applied in a counterclockwise direction about axis 24. Once a sufficient deformation of pushers 9 has occurred, the aggregate restorative force of the deformed pushers 9 becomes sufficiently large to overcome any frictional forces holding rotor assembly 27, second resonator 13, and shaft 5 in place and rotor assembly 27, second resonator 13, and shaft 5 will begin to rotate counterclockwise about axis 27. When pushers 9 move radially away from rotor 10, the pushers 9 undeform and stop applying a force against rotor 10. This process can then be repeated to maintain counterclockwise rotation of rotor assembly 27, second resonator 13, and shaft 5.

To operate valve 100 in a clockwise direction, controller 28 is configured to singly excite the second piezoelectric resonator 13. As a result of not exciting the first resonator 7, the pushers 9 will apply a constant frictional force against rotor assembly 27, holding rotor assembly 27 in a fixed position. Accordingly, rotor assembly 27 will be prevented from rotating. The excitation of second resonator 13 will however result in pushers 15 moving radially toward rotor 11 of rotor assembly 27. As a result, pushers 15 deform and begin to apply a restorative force against rotor 11 via a friction contact. Since a portion of the pushers 15 also extends along a counterclockwise direction about axis 27, the restorative force of the pushers 15 is preferentially applied in a counterclockwise direction about axis 24. Once a sufficient deformation of pushers 15 has occurred, the aggregate restorative force of the deformed pushers 15 becomes sufficiently large to overcome any frictional forces holding second resonator 13, and shaft 5 in place and second resonator 13 and shaft 5 will begin to rotate clockwise about axis 27. When pushers 15 move radially away from rotor 11, the pushers 13 undeform and stop applying a force against rotor 11. This process can then be repeated to maintain a clockwise rotation of second resonator 13 and shaft 5.

As described above, the various embodiments of the invention are not limited to valves including solely ball-type plugs. Rather, the various embodiments of the invention can be used with any type of valve, including gate, globe, pinch, diaphragm, needle, plug, ball, and butterfly valves, to name a few. For example, FIGS. 2 and 3 show how the piezoelectric motor of FIG. 1 could be used to operate pinch-type valves in accordance with embodiments of the invention.

FIG. 2 shows a first exemplary pinch-type piezoelectric valve 200, including a reversible piezoelectric motor in accordance with an embodiment of the invention. The reversible motor for shaft 5 in FIG. 2 is substantially similar to that described in FIG. 1. Accordingly, the description therein will be sufficient for describing the operation of FIG. 2. In the piezoelectric valve 200 in FIG. 2, the turning plug can made in the form of an eccentrically rotatable cylinder 19 rigidly mounted to the end of shaft 5, while the curved surface of the cylinder 19 is in contact with a elastic tube 20. For example, tube 20 can comprise a silicone or rubber tube. However, the various embodiments of the invention are not limited in this regard and other types of elastic materials can also be used. As shown in FIG. 2, the ends of the elastic tube 20 are connected to the inlet 2 and outlet 3 of valve 200 and tube 20 sits in a saddle 18 in the valve body 1. In operation, when shaft 5 is rotated, the cylinder 19 presses on the elastic tube 20 and regulates the size of the internal opening of the elastic tube 20, thus regulating flow through the valve.

FIG. 3 shows a second exemplary pinch-type piezoelectric valve 300, including a reversible piezoelectric motor for turning a valve plug in accordance with an embodiment of the invention. The reversible motor for shaft 5 in FIG. 3 is substantially similar to that described in FIG. 1. Accordingly, the description therein will be sufficient for describing the operation of FIG. 3. In the piezoelectric valve in FIG. 3, the turning plug can be made in the form of a piston 21 with a linear guide 22, while the shaft 5 is linked to the piston 21 through a "bolt-threaded hole" pair 23. In valve 300, the flat side of the piston 21 rests against an elastic tube 20, which sits in the saddle 18 of the valve body 1 and is attached to the inlet 2 and outlet 3.

The piezoelectric valve 300 in FIG. 3 can include a screw-type drive. In such a configuration the end of shaft 5 in FIG. 3 has a threaded hole and which is coupled to the corresponding screw 23 at the end of a piston 21. Rotation of the piston 21 is prevented by a retaining device 22 mechanically coupled to piston 21 to prevent its rotation within body 1. In operation, shaft 5 is rotated using a rotation drive body 6, as previously described with respect to FIG. 1. Rotation of shaft 5 causes the linear position of screw 23 to move within shaft 5 and the resulting linear motion is translated to piston 21, causing piston 21 to move up or down, depending on the direction of rotation. Alternatively, the end of piston 21 can have the threaded hole. In such embodiments, rotation of shaft 5 causes the linear position of screw 23 to move within piston 21 and the resulting linear motion is translated to piston 21, causing piston 21 to move up or down, depending on the direction of rotation.

Figure 4B:
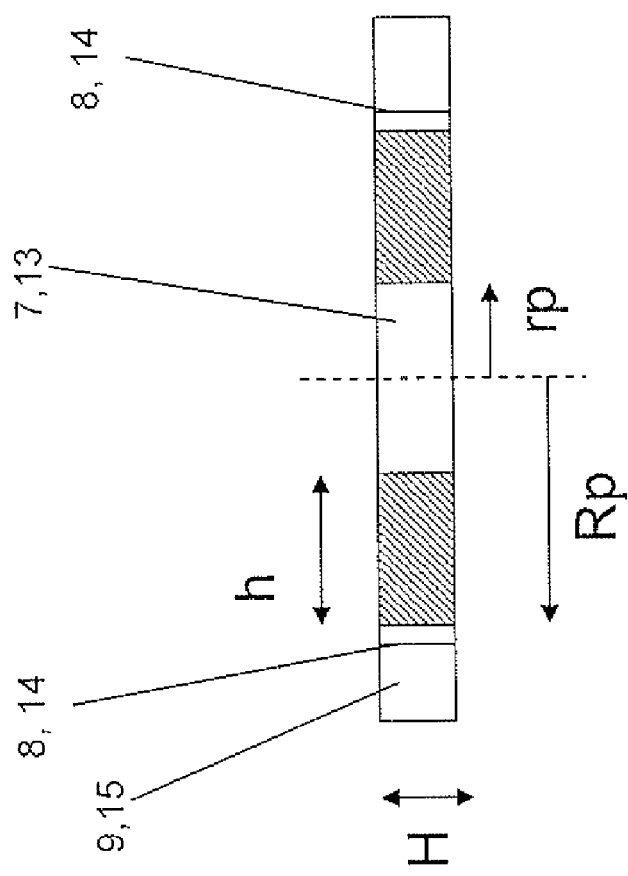
FIGS. 4A and 4B show top-down and cross-section views of an annular piezoelectric resonator in accordance with an embodiment of the invention.
Figure 4A:
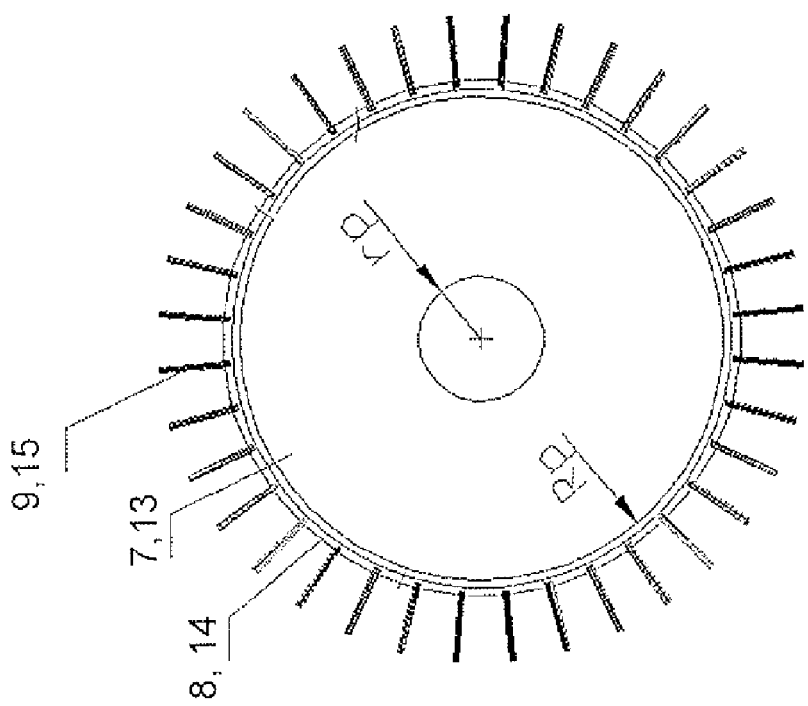

In the some embodiments of the invention, the reversible piezoelectric motor can require a high torque to provide high speed closing and opening of the valve. Piezoelectric motors with increased torque can be provided by improving the motor design parameters and at the same time eliminating the undesirable effects of any decrease in the Q factor. This is achieved by increasing the diameters of the rotor and the associated piezoelectric annular generator, while switching to a different excitation frequency, which excites the first order longitudinal vibrational mode across the annular width of the annular piezoelectric resonator. That is, the operating frequency of the applied voltage is selected to excite the first-order longitudinal mode of vibration radially across the annular width of the piezoelectric resonator. In particular, the Present Inventors have discovered that the operating frequency (F) for the excitation voltage can be described by the equation:

$$F=cp/2h, \quad (1)$$

where cp is the speed of propagation of the sound waves in the annular piezoelectric resonator material and h is the annular width of the annular piezoelectric resonator (i.e., h=Rp−rp, where Rp is the outer radius of the piezoelectric resonator and rp is the inner radius of the piezoelectric resonator, as shown in FIGS. 4A and 4B.)

In the various embodiments of the invention, excitation of the first order vibrational longitudinal mode can be achieved by configuring the piezoelectric resonators in the piezoelectric valve to have an outer radius (Rp) that is at least twice the inner radius (rp) (i.e., Rp>2rp) and an annular width (h) that is at least twice a thickness (H) of said piezoelectric resonator (i.e. h>2H). Therefore, when excited using an alternating voltage having a frequency (FrP) equal to cp/2(Rp−rp), a wave shell is operable to efficiently transfer oscillations of the piezoelectric resonators in the radial direction to the pushers to effect rotary movement of an associated rotor about a rotational axis with a significantly higher amount of torque than observed in conventional piezoelectric motors including annular piezoelements. Furthermore, the piezoelectric resonators can be polarized normal to its flat end surfaces and the electrodes can be affixed to these flat end surfaces. Accordingly, based on the relationships Rp>2rp and h>2H for the piezoelectric resonators and the piezoelectric material (which specifies cp), dimensions for the annular piezoelectric resonator for a particular excitation voltage frequency can be selected.

While various embodiments of the invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. A piezoelectric valve, comprising:
   a valve body comprising a rotatable plug;
   a drive body coupled to said valve body and operable to cause said rotatable plug to rotate about a rotational axis, said drive body comprising:
   a shaft disposed along said rotational axis, said shaft statically coupled to said plug and rotatably coupled to said drive body;
   a rotor assembly disposed about said rotational axis and rotatably coupled to said drive body;
   a first radial piezoelectric actuator disposed about said rotational axis and statically coupled to said drive body, said first radial piezoelectric actuator configured to frictionally engage an inner surface of said rotor assembly;
   a second radial piezoelectric actuator disposed about said rotational axis and statically coupled to said shaft, said second radial piezoelectric actuator configured to frictionally engage said inner surface of said rotor assembly.

2. The piezoelectric valve of claim 1, further comprising a control system configured to singly excite radial acoustic standing waves in one of said first and said second radial piezoelectric actuators, wherein said exciting of said radial acoustic standing waves in said first radial piezoelectric actuator causes said plug to rotate in a first direction and said exciting of said radial acoustic standing waves in said second radial piezoelectric actuator causes said plug to rotate in a second direction opposite to said first direction.

3. The piezoelectric valve of claim 1, wherein each of said first and said second piezoelectric actuators comprises:
   an annular piezoelectric resonator;
   a complementary generator acoustically coupled to the annular piezoelectric resonator; and
   one or more first flexible pushers mechanically extending from said complementary generator, said pushers extending at least radially with respect to said rotational axis and frictionally contacting said inner surface of said rotor assembly.

4. The piezoelectric valve of claim 3, wherein a radius of an outer rim (Rp) of said annular piezoelectric resonator is at least twice a radius of an inner rim (rp) of said annular piezoelectric resonator, and wherein an annular width of said annular piezoelectric resonator (Rp−rp) is at least twice its thickness.

5. The piezoelectric valve of claim 4, wherein an alternating voltage for exciting said annular piezoelectric resonator has a frequency equal to cp/2(Rp−rp), where cp is the speed of propagation of sound waves in a piezoelectric material in said annular piezoelectric resonator.

6. The piezoelectric valve of claim 3, wherein a piezoelectric material in said annular piezoelectric resonator is polarized in a direction normal to a radial direction of said annular piezoelectric resonator.

7. The piezoelectric valve of claim 1, wherein said rotor assembly further comprises:
   a first rotor mounted coaxially with respect to said first piezoelectric actuator and in frictional contact with said first piezoelectric actuator,
   a second rotor mounted coaxially with respect to said second piezoelectric actuator and in frictional contact with said second piezoelectric actuator, said second rotor statically coupled to said first rotor; and
   a sound-proof gasket disposed between said first and said second rotors.

8. The piezoelectric valve in claim 1, wherein at least one of the second piezoelectric actuator and the shaft is equipped with at least one marker of angular position, and wherein said drive body further comprises at least one sensor for detecting said marker.

9. The piezoelectric valve in claim 8, wherein said marker comprises an optical grating made of optical disc raster, wherein said sensor comprises an opto-electrical sensor.

10. The piezoelectric valve in claim 1, further comprising a elastic tube having ends connected to an inlet and an outlet of said valve body, wherein the turning plug further comprises an eccentrically rotatable cylinder having a curved surface in contact with said elastic tube, wherein responsive to said plug being rotated said curved surface is operable to regulate the size of an internal opening of the elastic tube.

11. The piezoelectric valve in claim 1, further comprising a elastic tube having ends connected to an inlet and an outlet of said valve body, wherein the turning plug further comprises a piston having a piston surface in contact with said elastic tube, wherein responsive to said plug being rotated said piston surface is operable to regulate the size of an internal opening of the elastic tube.

12. The piezoelectric valve in claim 11, wherein an end of said shaft has a threaded hole, and wherein said shaft is coupled to the corresponding screw at the end of the piston.

13. The piezoelectric valve in claim 11, wherein an end of said piston has a threaded hole, and wherein said piston is coupled to the corresponding threaded the end of the shaft.

14. The piezoelectric valve in claim 1, wherein each of said first and said second radial piezoelectric actuators comprises:
   a piezoelement configured for generating a longitudinal vibration in a radial direction with respect to said rotational axis;
   one or more flexible pushers, each of said flexible pushers having a first end mechanically coupled to said piezoelement and a second end extending in said radial direction and contacting said surface of said rotor assembly.

15. A piezoelectric valve, comprising:
   a valve body with at least one inlet, at least one outlet, and a turning plug;
   a rotation drive kinematically connected to said turning plug through a shaft, said rotation drive comprising a reversible piezoelectric motor, and said reversible piezoelectric motor comprising:
      a first annular piezoelectric resonator, said first piezoelectric resonator fixed with respect to the body,
      a first complementary generator acoustically coupled to the first piezoelectric resonator and having one or more first flexible pushers,
      a first rotor mounted coaxially with respect to the first piezoelectric resonator and in frictional contact with said first flexible pushers,
      a second annular piezoelectric resonator statically coupled to the turning plug through the shaft,
      a second complementary generator acoustically coupled to the second piezoelectric resonator and having one or more second flexible pushers, and
      a second rotor mounted coaxially with respect to the second piezoelectric resonator and in frictional contact with said second flexible pushers, said second rotor statically coupled to said first rotor through a sound-proof gasket.

16. The piezoelectric valve of claim 15, wherein said first pushers are disposed along the circumference of said first piezoelectric resonator at substantially equal angular distances from one another, and wherein said second pushers are disposed along the circumference of said second piezoelectric resonator at substantially equal angular distances from one another.

17. The piezoelectric valve of claim 15, wherein each of said first and said second complementary resonator comprise ring shells.

18. The piezoelectric valve of claim 15, wherein each of said first and said second complementary resonator each comprise a flat circular disc acoustically coupled to respective ones of said first and said second piezoelectric resonators across their plane surfaces.

19. The piezoelectric valve of claim 15, wherein at least one of the second piezoelectric resonator and the shaft is equipped with at least one marker of angular position, and further comprising at least one sensor for detecting said marker.

20. The piezoelectric valve in claim 19, wherein said marker comprises an optical grating made of optical disc raster, wherein said sensor comprises an opto-electrical sensor.

21. The piezoelectric valve in claim 15, further comprising an elastic tube having ends connected to an inlet and an outlet of said valve body, wherein the turning plug further comprises an eccentrically rotatable cylinder having a curved surface in contact with said elastic tube, wherein responsive to said plug being rotated said curved surface is operable to regulate the size of an internal opening of the elastic tube.

22. The piezoelectric valve in claim 15, further comprising an elastic tube having ends connected to an inlet and an outlet of said valve body, wherein the turning plug further comprises a piston having a piston surface in contact with said elastic tube, wherein responsive to said plug being rotated said piston surface is operable to regulate the size of an internal opening of the elastic tube.

23. The piezoelectric valve in claim 22, wherein an end of said shaft has a threaded hole, and wherein said shaft is coupled to the corresponding screw at the end of the piston.

24. The piezoelectric valve in claim 22, wherein an end of said piston has a threaded hole, and wherein said piston is coupled to the corresponding threaded the end of the shaft.

25. The piezoelectric valve in claim 15, wherein said external electrical control system further comprises at least one power supply coupled to at least one of said first and said second annular piezoelectric resonators, said power supply providing an alternating voltage for inducing a first order longitudinal vibrational mode across an annular width of said first and said second annular piezoelectric resonators.

26. The piezoelectric valve in claim 25, wherein a radius of said outer rim ($R_p$) is at least twice the radius of said inner rim ($r_p$), wherein an annular width of said one of said annular piezoelectric resonators ($R_p-r_p$) is at least twice its thickness.

27. The piezoelectric valve in claim 26, wherein said alternating voltage has a frequency equal to $c_p/2(R_p-r_p)$, where $c_p$ is the speed of propagation of sound waves in a piezoelectric material in said one of said annular piezoelectric resonators.

28. The piezoelectric valve in claim 15, wherein a piezoelectric material in said first and said second annular piezoelectric resonators is polarized in a direction parallel to said shaft.

* * * * *